H. S. HALLWOOD.
CASH REGISTER.
APPLICATION FILED APR. 1, 1899.

909,786.

Patented Jan. 12, 1909.
12 SHEETS—SHEET 1.

WITNESSES:

INVENTOR
Henry S. Hallwood
BY
C. C. Shepherd
ATTORNEY

H. S. HALLWOOD.
CASH REGISTER.
APPLICATION FILED APR. 1, 1899.

909,786.

Patented Jan. 12, 1909.
12 SHEETS—SHEET 2.

Witnesses
J. H. Fravel
H. B. Bradshaw

Inventor
Henry S. Hallwood
By his Attorney
C. C. Shepherd

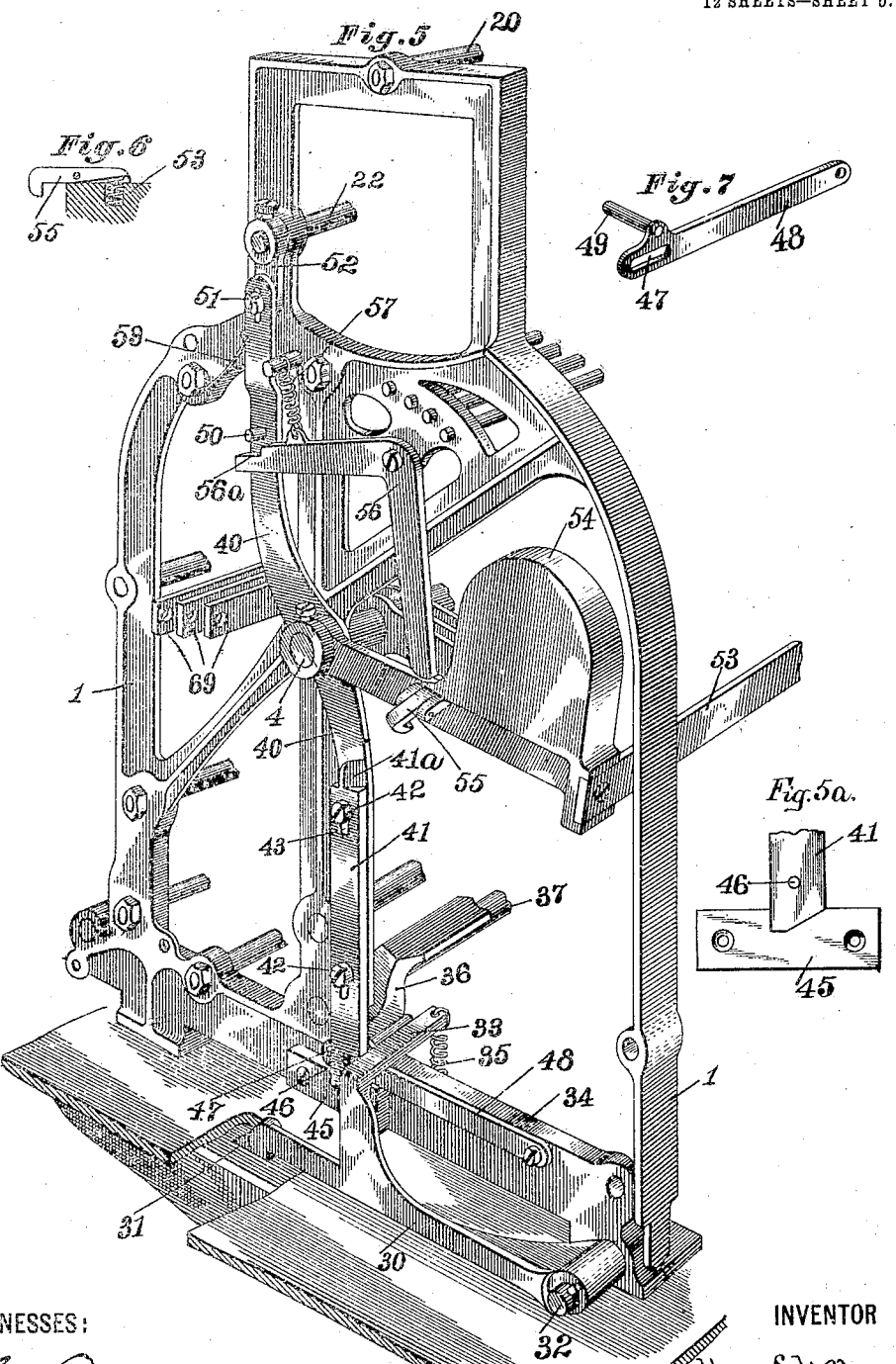

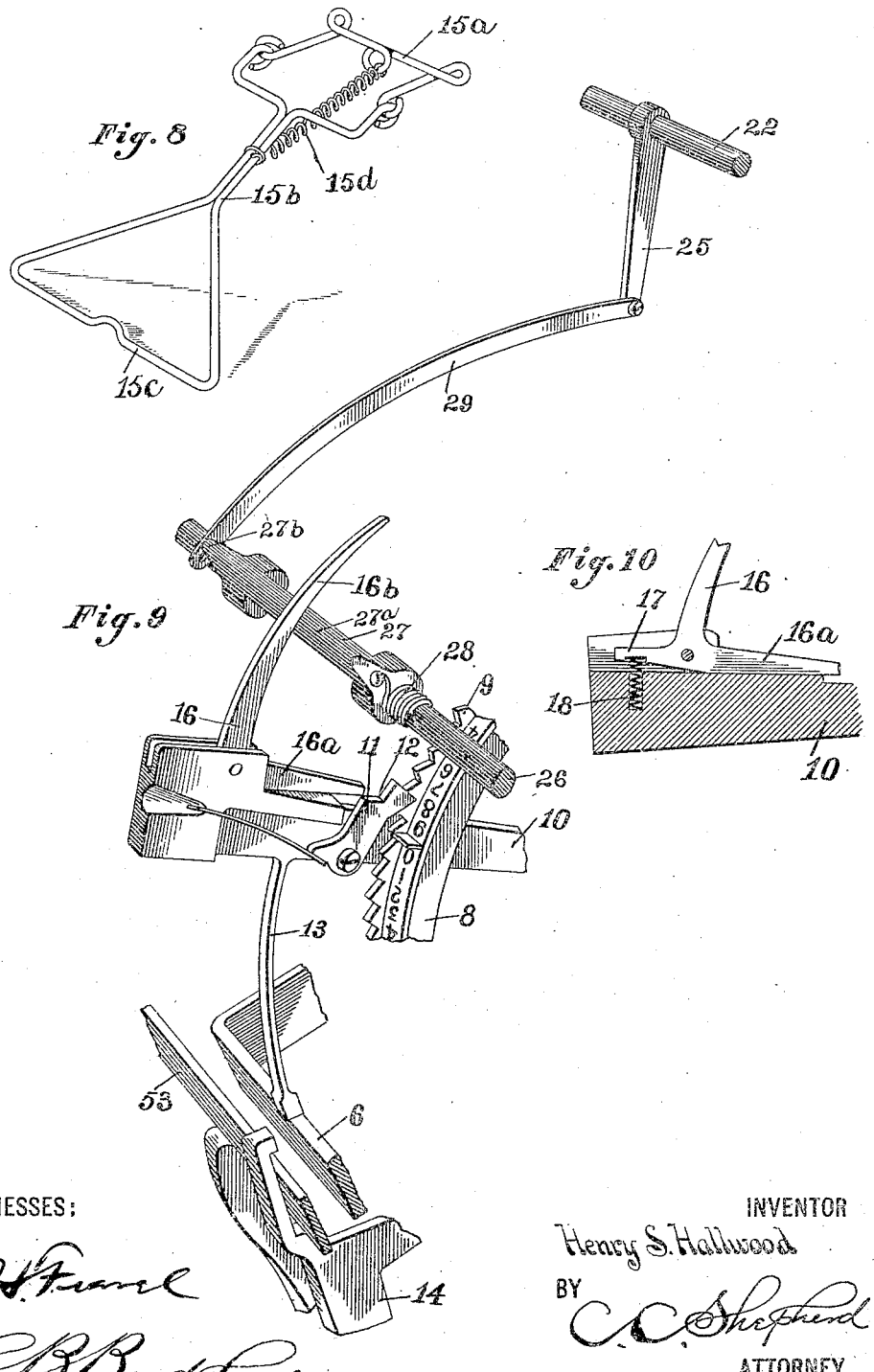

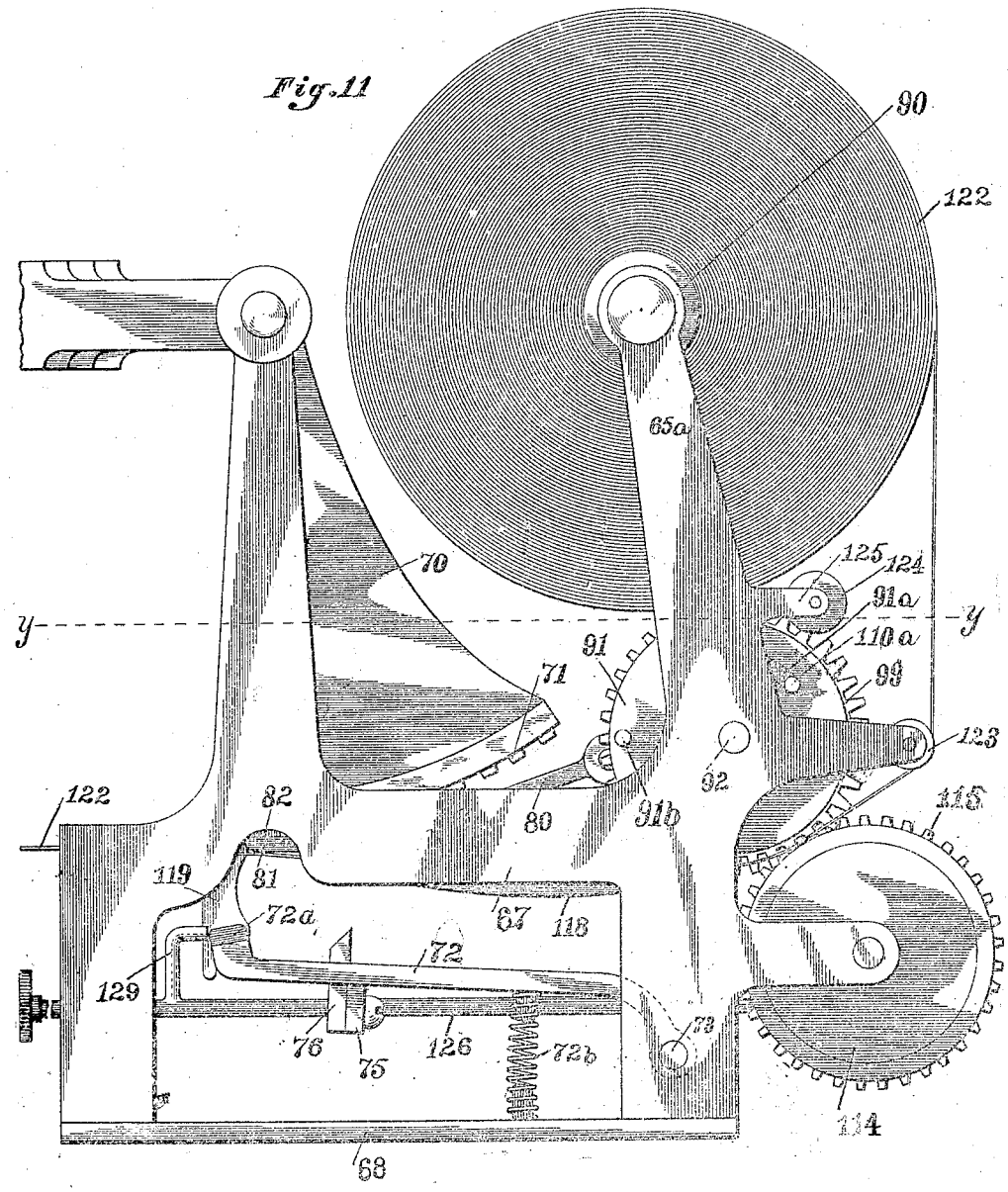

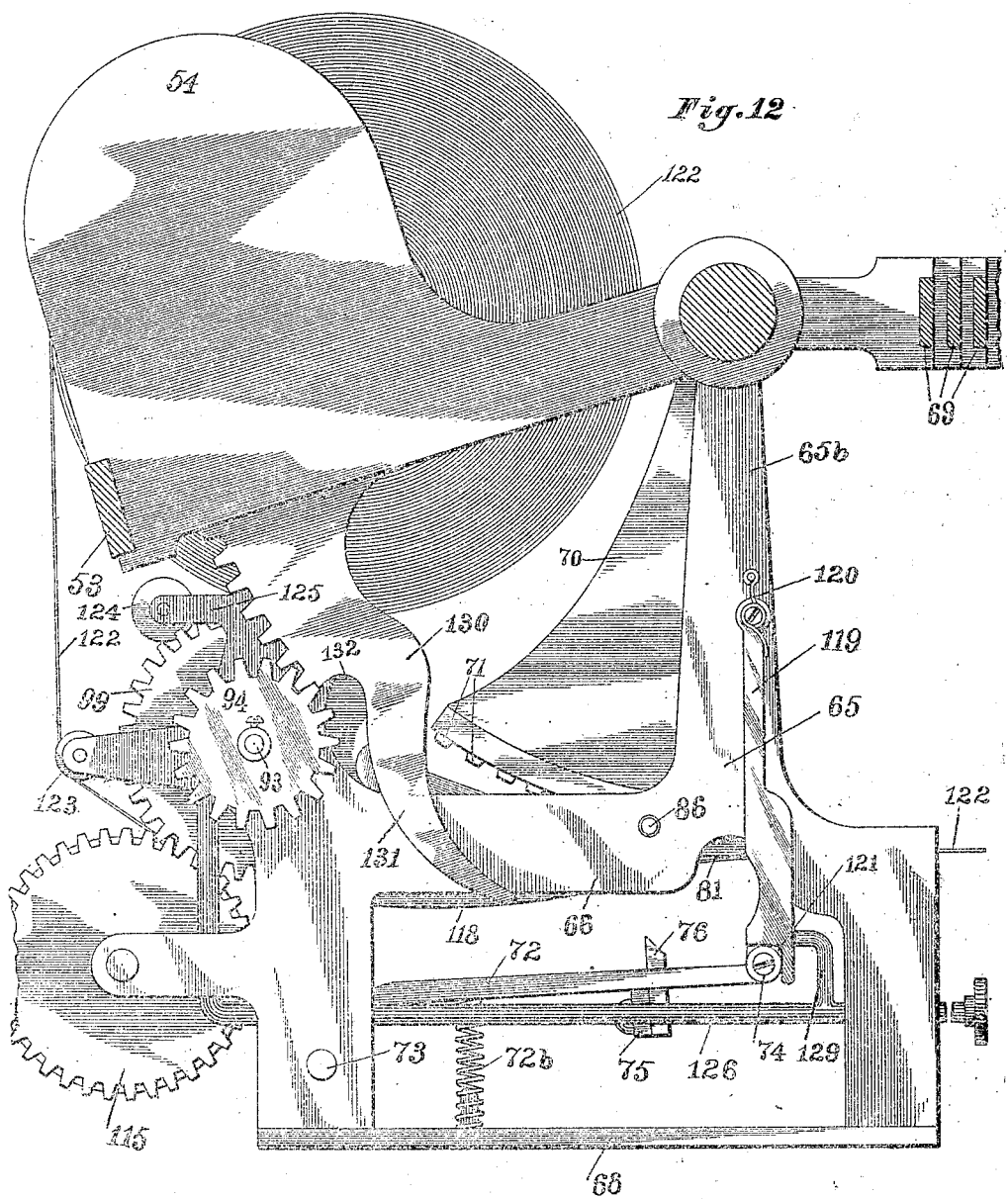

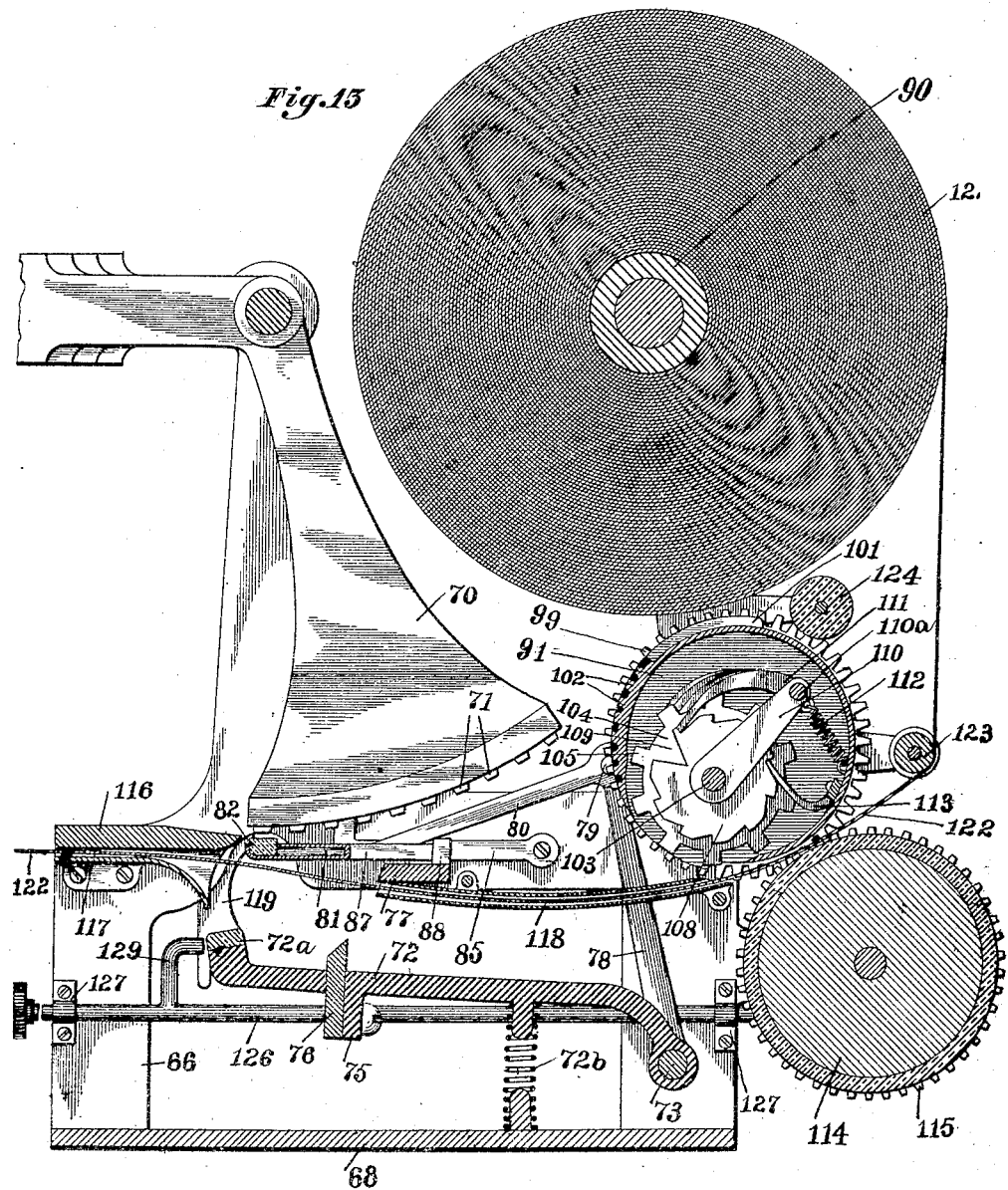

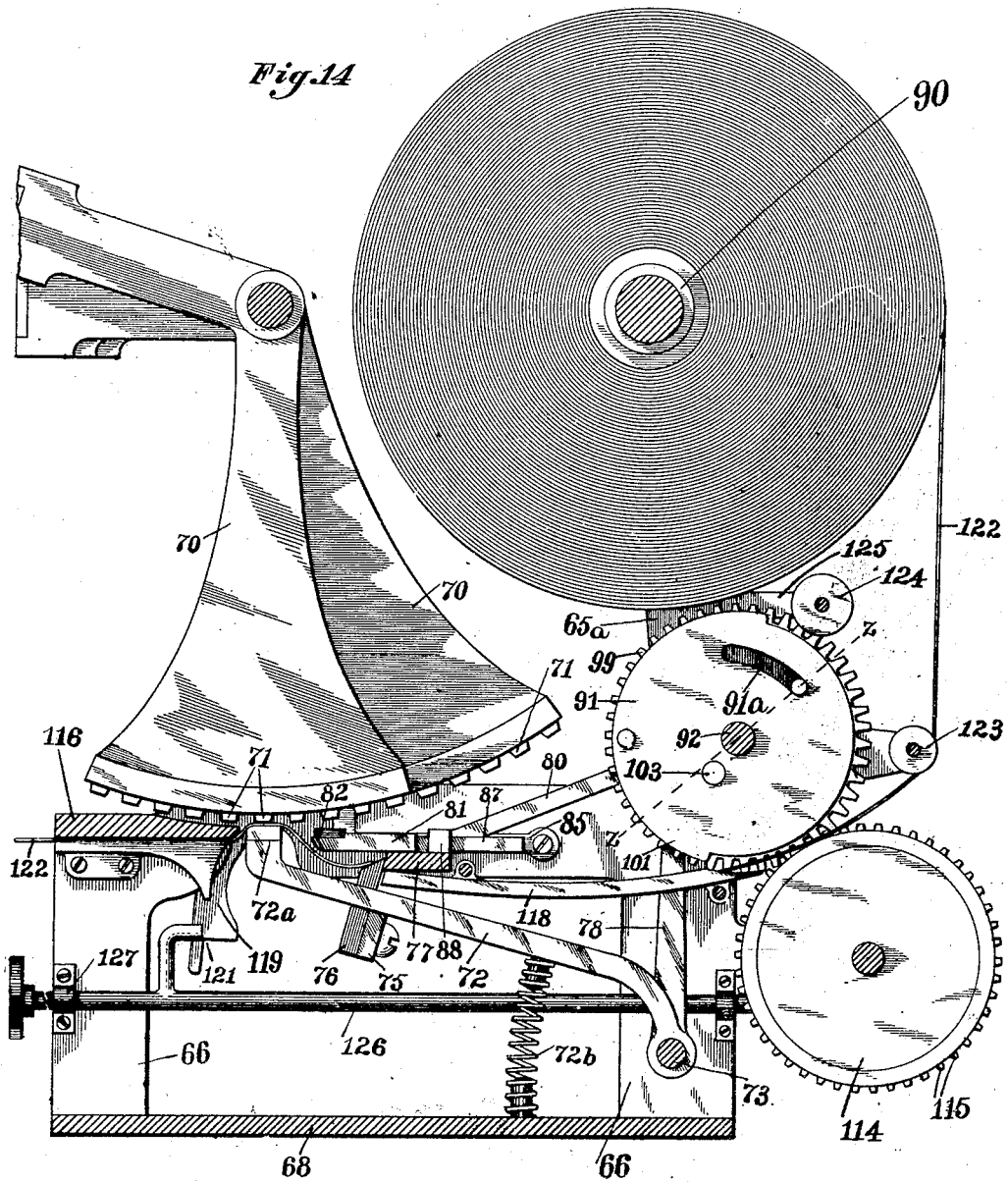

H. S. HALLWOOD.
CASH REGISTER.
APPLICATION FILED APR. 1, 1899.
909,786.
Patented Jan. 12, 1909.
12 SHEETS—SHEET 11.
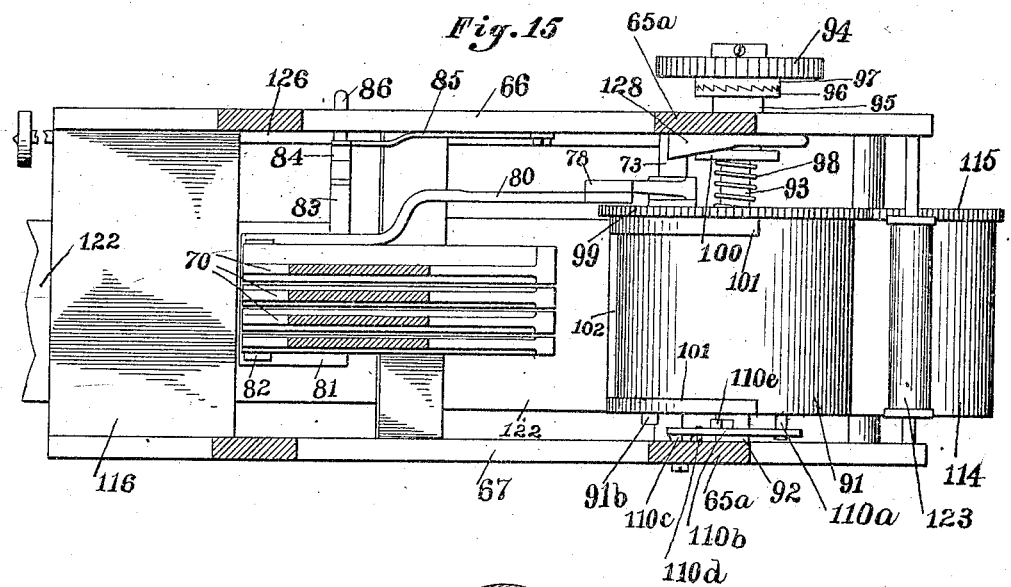
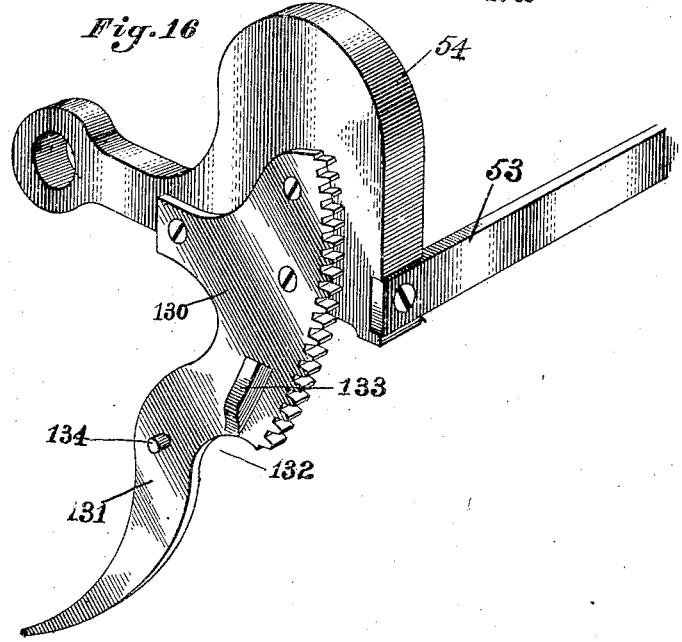
Witnesses
J. H. Frank
H. B. Bradshaw
Inventor
Henry S. Hallwood
By his Attorney
C. C. Shepherd

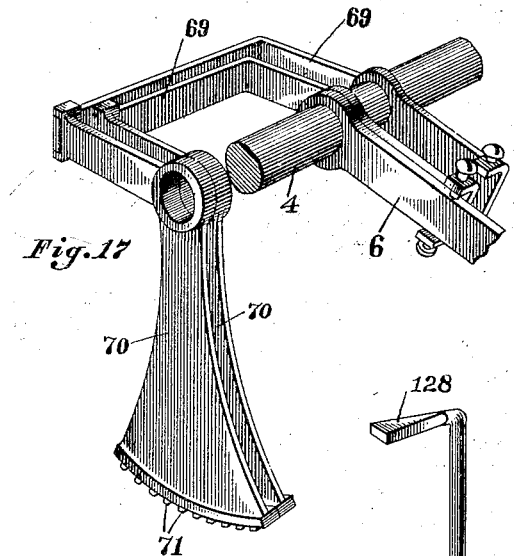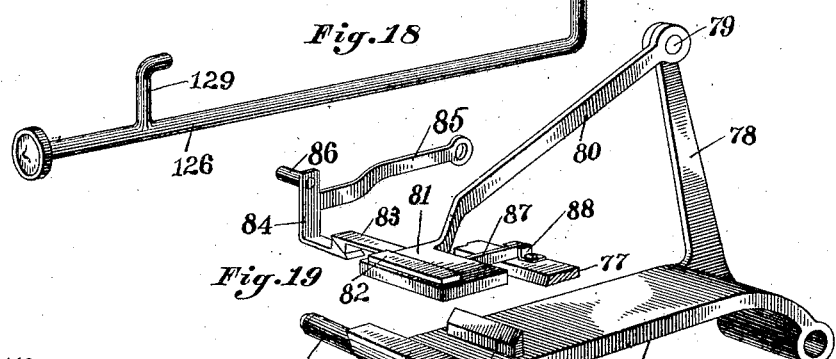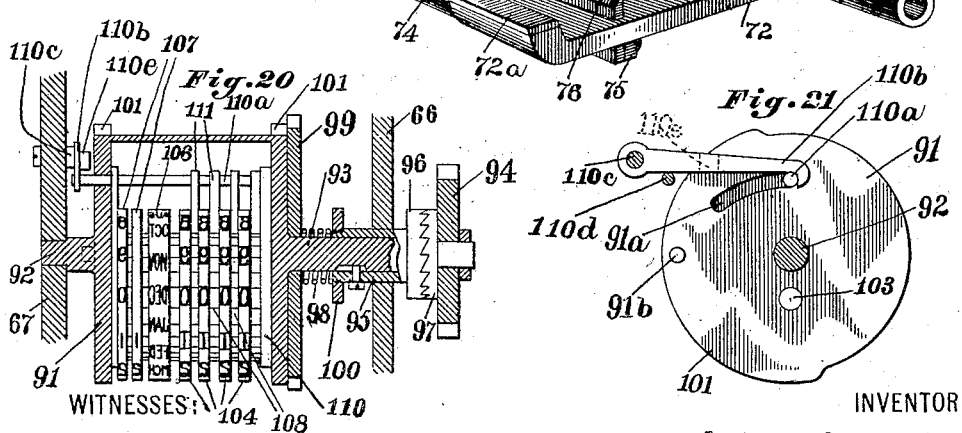

UNITED STATES PATENT OFFICE.

HENRY S. HALLWOOD, OF COLUMBUS, OHIO, ASSIGNOR, BY MESNE ASSIGNMENTS, TO HIMSELF AND ANNIE HALLWOOD, OF COLUMBUS, OHIO.

CASH-REGISTER.

No. 909,786.  Specification of Letters Patent.  Patented Jan. 12, 1909.

Application filed April 1, 1899. Serial No. 711,229.

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a specification.

My invention relates to the improvement of cash registers and the objects of my invention are, first, to provide a cash register with improved means for locking and releasing the amount indicator wheels; second, to provide in conjunction therewith improved means for preventing the release or operation of the indicator wheels when the cash drawer is in an open or partially open position; third, to provide in conjunction with other parts of the cash register, improved means for locking and releasing the registering wheel operating pawls; fourth, to provide a cash register cash drawer with an improved bill holding or pressing device; fifth, to provide an improved device for preventing the closing of the cash drawer without first moving the same to a complete open position or opening the same without completely closing it; sixth, to combine with the registering mechanism a check printing mechanism of improved construction whereby paper checks or slips are formed and the amounts registered together with the dates, consecutive numbers of the transactions and other matters are printed on said checks or slips and to produce certain improvements in details of construction and arrangement of the parts of the mechanism, which will be more fully pointed out hereinafter. These objects I accomplish in the manner illustrated in the accompanying drawings, in which—

Figure 1:
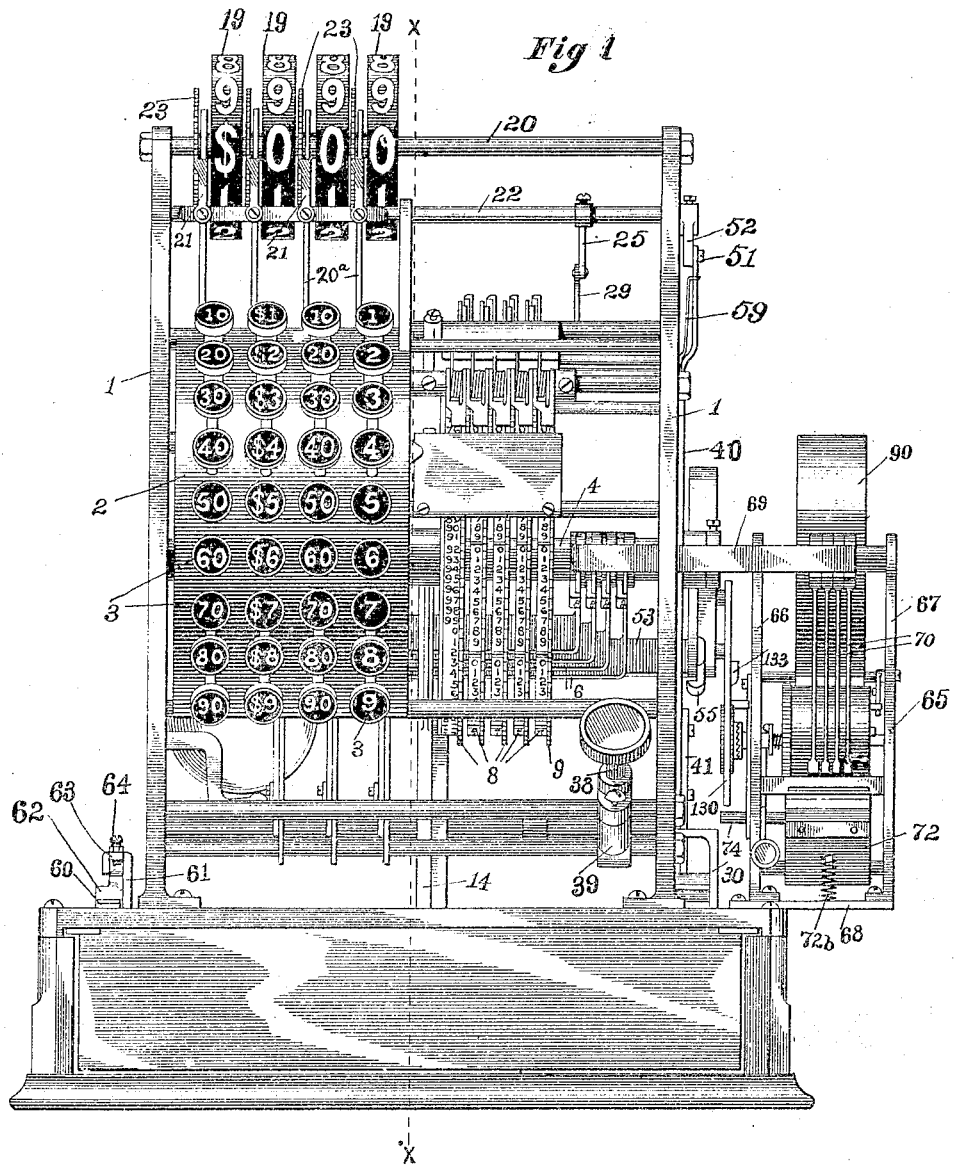
Figure 2:
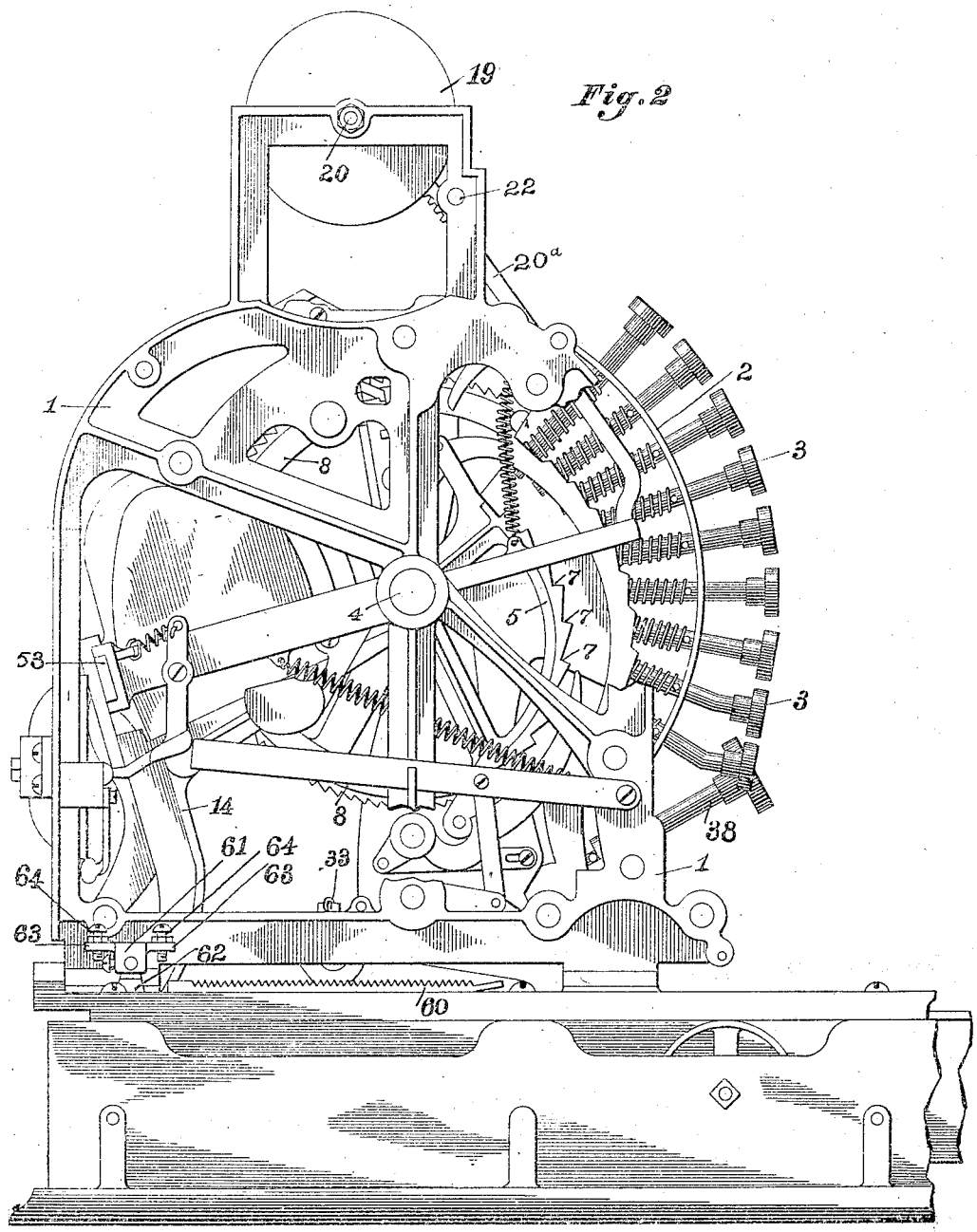
Figure 3:
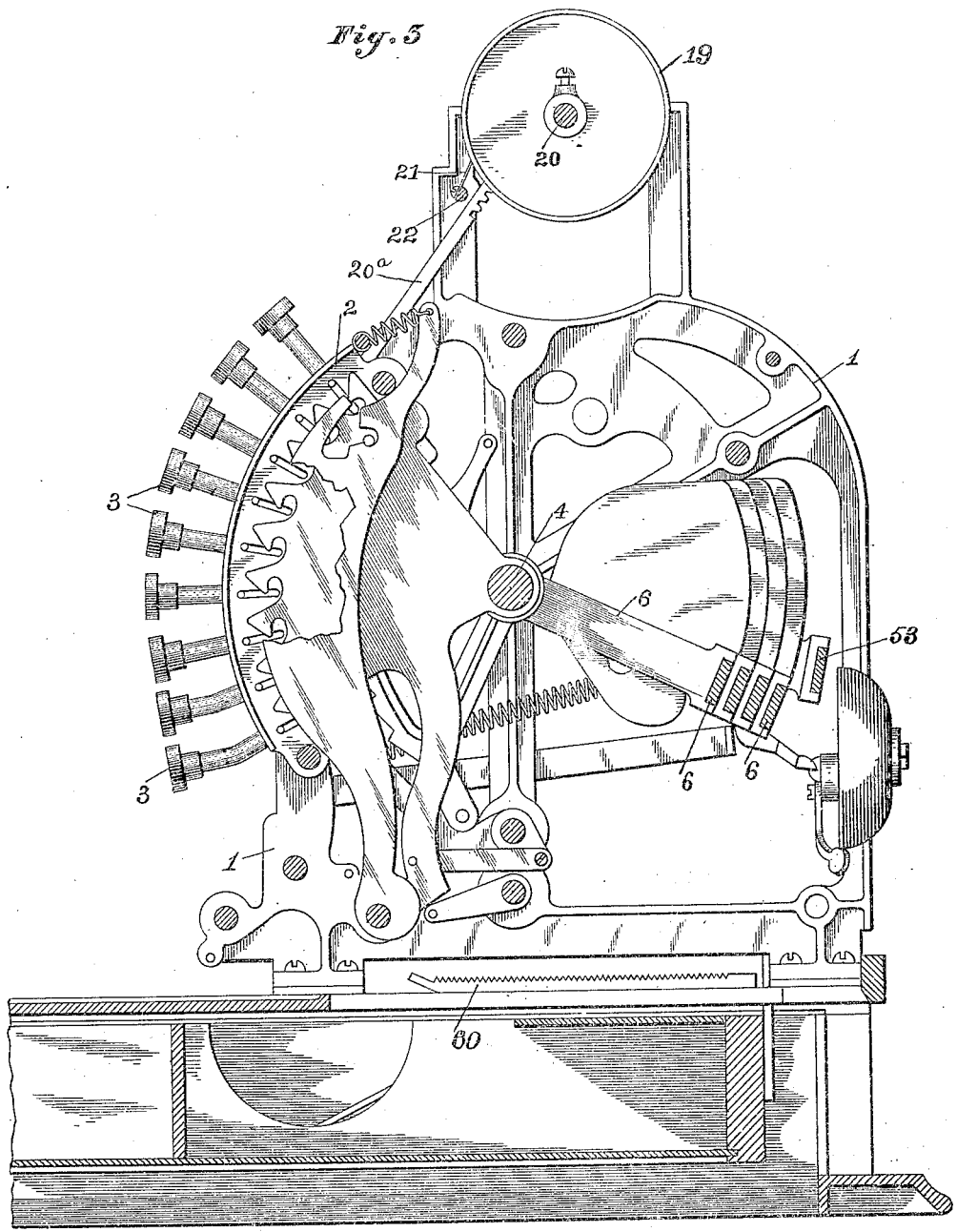
Figure 4:
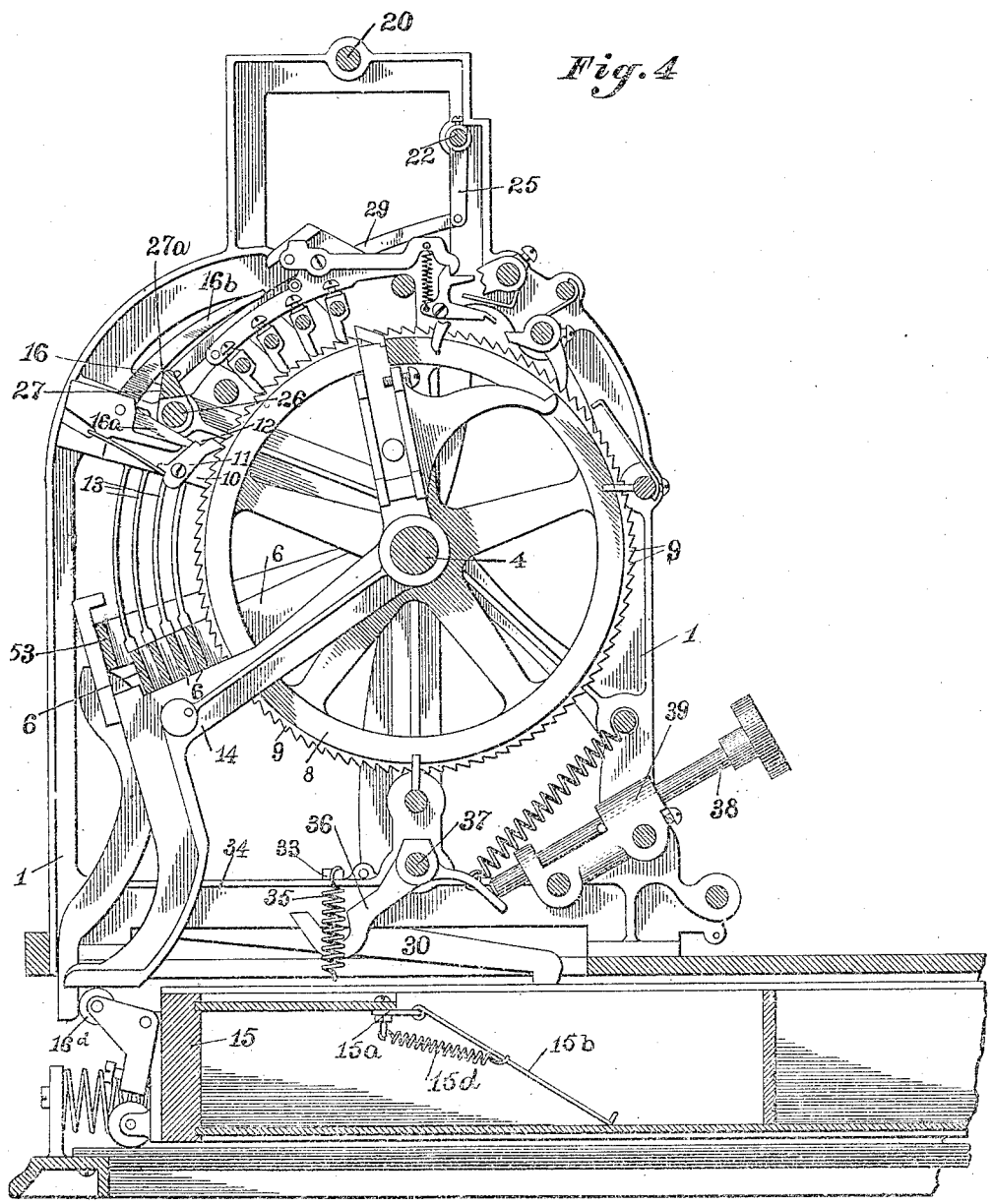

Figure 1 is a front elevation of a cash register having my improvement thereon, the same being shown without a casing or covering. Fig. 2 is a side elevation of the same. Fig. 3 is a sectional view taken on line x x of Fig. 1. Fig. 4 is a similar view on line x x of Fig. 1 looking in the opposite direction from that shown in Fig. 3. Fig. 5 is a detail view in perspective of one end of the machine. Fig. 5ª is a detail view in elevation of the mechanism shown in Fig. 5. Fig. 6 is a detail view partially in section and partially in elevation illustrating a spring actuated catch which I employ in the manner hereinafter described. Fig. 7 is a detail view of a lifting arm hereinafter described. Fig. 8 is a detail view in perspective of my improved bill holding attachment for the cash drawer. Fig. 9 is a detail view in perspective illustrating the means for locking and releasing the registering wheel controlling pawls. Fig. 10 is a detail view partially in section and partially in elevation showing a portion of the locking lever illustrated in Fig. 9. Fig. 11 is an enlarged side elevation of the check printing mechanism showing the same detached from the cash register. Fig. 12 is a similar view of the opposite side of said check printer showing a portion of the cash register mechanism and means connected therewith for imparting motion to the paper strip feeding drum. Fig. 13 is a central vertical section of the check printing mechanism. Fig. 14 is a side elevation of said check printing mechanism with the outer frame standard moved. Fig. 15 is a sectional view on line y y of Fig. 11. Fig. 16 is a detail view in perspective of a portion of a swinging register yoke showing attached thereto the check printer operator. Fig. 17 is a detail view in perspective illustrating the connection of the printing segments with the registering yokes. Fig. 18 is a similar view of a sliding rod which I employ for the purpose of throwing the check printer out of operation. Fig. 19 is a detail view in perspective of the platen frame inking pad and adjoining parts. Fig. 20 is a sectional view on line z z of Fig. 14 and Fig. 21 is a detail view in elevation of the end of one of the feed rollers.

Similar numerals refer to similar parts throughout the several views.

The general class of cash registers to which my improvements belong, is that in which one or more sets or series of value keys are employed and wherein mechanism is provided whereby an amount corresponding with the value key depressed is registered and at the same time added to an amount previously registered.

The particular form of registering mechanism to which my improvements apply is that in which mechanism is provided wherein the depression of a value key sets a registering wheel operating pawl in position to move the corresponding registering wheel through movement of the cash drawer a distance sufficient to register an amount corresponding with said depressed key.

In order to illustrate and explain my present improvements, I have shown in the accompanying drawings mechanism for setting the registering wheel operating pawls and for moving said pawls and consequently moving the registering wheels the same as that shown and described in my former applications for patent filed under date of January 3rd, 1899 and numbered respectively 700,907 and 700,908. As in my said former applications, I employ a main framework consisting of connected vertical side standards 1 at the front and on one side of the center of which I provide a curved key frame 2 wherein are supported spring actuated depressible keys 3, the latter being arranged in sets or series, said sets in the present illustrations indicating units, tens, hundreds, and tens of hundreds or cents, dimes, dollars and tens of dollars. As in said former applications, I provide a central or main shaft which is indicated at 4. As indicated and as set forth in said former applications, I mount on the shaft 4 swinging frames, each frame consisting of a forward segmental portion 5 and a rear yoke shaped portion 6, the side arms of said yoke portion being fulcrumed near opposite ends of the shaft 4. The number of said swinging frames corresponds with the number of sets of value keys and one of the frame segments 5 is arranged opposite each of said key sets. As indicated herein and described in said former applications, the rims of the segmental portions 5 are in the arc of the circle eccentric to the shaft 4, said rims being provided with successively arranged notches or stop shoulders 7, one of said notches being formed for engagement with the inner end of each of the depressed keys of the corresponding set, thus limiting the upward swinging movement of the segment and downward swinging movement of the yoke which is connected therewith in proportion to the value of the key depressed.

8 represents the registering wheels which correspond in number with the sets of value keys, said registering wheels being journaled on the shaft 4 and in addition to having stamped or otherwise made to appear on their peripheries, the amounts or numbers corresponding with the numbers of said value keys, each of said wheels is provided with projecting teeth 9 one opposite each number of the periphery thereof.

Mounted to swing on the shaft 4 adjacent to each of the registering wheels 8 is the inner end of a pawl carrying arm 10, the outwardly extending portion of which is provided with a spring actuated pawl 11 the outer end or tooth of which is adapted to engage the teeth of the adjoining registering wheel, this construction being shown more clearly in Fig. 9 of the drawing. In the present instance, each of the pawls 11 is provided in its upper portion and outer side with an angular recess or shoulder which is indicated at 12. Each of the pawl arms has depending from its outer portion a supporting stem 13, the lower end of which bears upon the corresponding frame yoke 6, these frame yokes and consequently said pawl arms being normally supported in an elevated position when the cash drawer is closed by an angular lever 14 which also swings from said shaft 4 and the downwardly extending arm of which bears against the rear side of the cash drawer 15 or against a friction roller 16$^d$ thereon, said cash drawer being located and adapted to slide within the lower portion of the framework in the usual manner.

In the formation of each of the pawl carrying arms 10, I fulcrum in the channeled upper side of the outer portion thereof an angular pawl locking lever 16, the latter being in the nature of a bell crank and consisting of a forwardly extending lower arm portion 16$^a$ and an upwardly and forwardly curved and longer arm portion 16$^b$. As indicated more clearly in Fig. 10 of the drawing the bell crank 16 is at the junction of its two arms provided with a short rearward extension 17 which is normally elevated by a spring 18 through which the arm 16$^a$ is normally depressed, as shown.

19 represents amount indicator wheels which are journaled upon a shaft 20 in the top of the framework, said indicator wheels being provided with peripheral numbers and means being employed whereby said indicator wheels are rotated to display on their forward sides the amounts registered. These indicator wheels are temporarily locked in the desired positions on the shaft 20 by pawls 21 which are secured to a transverse journal shaft 22, said pawls being adapted in the manner hereinafter described to be engaged with or disengaged from the teeth of ratchet wheels 23 one of the latter being connected with each of said rotary indicator wheels.

In the manner hereinafter described, means are employed whereby a sufficient outward rotary motion is imparted to the shaft 22 to cause a disengagement of the pawls 21 with said ratchet wheels, thus leaving the indicator wheels free to be moved by suitable mechanism, such, for example, as is shown in the patent to McCormick No. 570,141, and which consists of racks 20$^a$ that are yieldingly connected with the yokes 6 so as to move therewith. These racks gear with pinions on the indicator wheels, and as the former are moved the wheels are turned to indicate the amount of the transaction.

In carrying out my present invention, I connect with the shaft 22 one end of a downwardly extending arm 25.

26 represents a transverse rod which extends across the rear portion of the machine at a point above the pawls 11, said rod having mounted loosely thereon a sleeve 27, the latter being formed with a raised or outwardly projecting portion 27ª which is provided with an outer end extension indicated at 27ᵇ. The sleeve 27 is through the medium of a spring 28 one end of which connects with the rod 26 and the remaining end of which connects with said sleeve, normally retained in such position as to cause its raised portion 27 to project upwardly. The extension 27ᵇ of the sleeve 27 is, as indicated in Fig. 9 of the drawing, connected with the lower end of the arm 25 through the medium of a curved bar 29 the forward end of the latter being pivoted to the end of said arm 25 and the rear end thereof being slotted to receive said sleeve extension.

As set forth in my said former applications, means are provided whereby the depression of one key of a set releases that frame segment 5 which corresponds with said key set, thus causing by the outward or opening movement of the drawer and consequent downward swinging movement of the lever 14 a dropping or swinging movement of that frame yoke with which said released segment is connected. Through the limit of the swinging movement of the segment 5 attained in the manner heretofore described, it is obvious that the downward movement of the released frame yoke is similarly limited, with the result that the pawl 11 of the corresponding pawl arm 10 is dropped downward over the desired number of teeth of the corresponding registering wheel. When the drawer is again closed and the released yoke raised to its former position, it is obvious that the registering wheel with which said pawl engages, must have been rotated a distance corresponding with the value of the amount key depressed. In Fig. 4 of the drawing, is shown the normal position of the lower arm 16ª of the bell crank 16, the outer end of said arm being in contact with the rear edge or side of the pawl 11 at a point immediately below the pawl recess 12, said pawl being thus locked in its position of engagement with a tooth of a registering wheel. The slight rotary motion which is imparted to the shaft 22 at the first operation of opening the drawer to be hereinafter described, results in the connecting bar 29 being forced forwardly until the sleeve extension 27ᵇ is in the outer or extreme end of the slot of said bar. In the construction of the machine, the pawl carrying arms 10 are provided with sufficient play to cause a slight dropping of all of said arms when the supporting lever 14 is released or swung downward by the opening of the drawer as hereinbefore described. As indicated in Fig. 4 of the drawing, the normal position of the bell crank arms 16ª is in close proximity to the underside of the shaft 26, the latter thus normally preventing any upward movement or disengagement of the arms 16ª from the pawls. It will also be observed that in its normal position, the sleeve projection 27ª of the shaft 26 is in contact with the bell crank arm 16ᵇ, said sleeve being thus prevented from outward movement while said arm 16ᵇ is in the position shown in Fig. 4. The slight dropping movement of the pawl carrying arms above described results in the arm 16ª being lowered out of contact with the shaft 26 and in the sleeve projection 27ª through tension of its spring 28, forcing the bell crank arm 16ᵇ outward and the arm 16ª upward and out of engagement with the pawl 11. In this manner the pawl is free to move downward over the teeth of the registering wheel, if a key in its corresponding bank has been depressed. In any event, all the pawl carrying arms drop a sufficient distance to release the pawls from the bell crank arms 16ª but this dropping movement is not sufficient to cause any pawl to engage a new tooth on its register wheel unless a key in its corresponding bank has been depressed. Through the means hereinafter described the first inward or closing movement of the drawer imparts such partial rotation to the rod 22 as to cause the connecting bar 29 to move forward thus raising the projecting portion 27ª of the sleeve 27, thereby allowing the spring actuated bell crank arm 16ᵇ to move forward and its arm 16ª to again drop into contact with the rear side of the pawl, thus securing a positive engagement of the pawl teeth with the tooth of the registering wheel and preventing any possibility of an overthrow or surplus upward movement of said wheel. This positive engagement of the pawl with the tooth of the registering wheel, also prevents any possibility of the pawl dropping out of engagement with said tooth in case the drawer should be partially closed and afterwards by any means again returned to the open position.

As in my said former applications, I provide a drawer latch or catch bar 30 at one side of the machine frame, the forward hook end of which is adapted to engage a recess 31 of the drawer and lock the same in a closed position and the rear end of which is fulcrumed to the rear portion of the frame at 32. This latch bar is provided in its forward portion with an upward and thence inwardly extending or angular arm 33 (see Fig. 5) the horizontal portion of which bridges the upper side of a lower transverse frame arm 34 on the inner side of which the end of said arm 33 is connected with the lower framework by a vertical coiled spring 35. 36 represents the angular drawer catch trip lever which is fulcrumed on a frame rod 37, the rear arm of said lever being adapted in my former constructions when swung upward to contact with and lift the latch arm 33, thus raising the catch bar 30 out of engagement with the drawer and admit of the latter being moved to the open position through the pressure of the lever 14 or other additional means. This swinging movement of the lever 36 is imparted by depressing a sliding drawer releasing key 38 which is mounted in a frame bracket 39, the inner end of said key stem contacting with the forward arm of the lever 36.

40 represents a lever which is fulcrumed on the outer end of the shaft 4 on that side of the machine on which is employed the catch bar 30. The lower arm or that portion of the lever 40 which is below its fulcrum point has attached thereto and mounted to slide vertically on its outer face a bar 41, the latter being capable of having imparted thereto a sliding movement on the arm 40 by reason of the attaching pins or screws 42 passing through slotted openings 43 which are formed in said bar 41. The lower end of the bar 41 as indicated more clearly in Fig. 5ª of the drawing, normally engages a notch in the upper side of a block 45 which is secured to or formed with the outer side of the lower framework. This lower portion of the bar 41 is provided as indicated at 46 with an inwardly projecting pin, the latter engaging a slotted opening 47 in a lifting bar 48, the rear end of which is pivoted to the rear portion of the frame piece 34. This lifting bar 48 is provided with an inwardly projecting pin 49 which projects over the frame piece 34 and which is adapted to contract and be lifted by the rear arm of the lever 36 when the key 38 is depressed, thereby exerting through the elevation of the bar 48 a lifting movement of the catch arm 33 and a disengagement of the latch arm 30 with the drawer, allowing the latter to move outward to the open position by pressure of the lever 14. The upper end of the vertically sliding bar 41 is provided with an inclined extension 41ª as shown in Fig. 5 of the drawing. The upper portion of the lever 40 or that portion which is above its fulcrum point is provided with an outwardly projecting pin 50, while the upper extremity of said lever 40 is jointly connected at 51 with a depending arm 52 which is fixed on the outer end of the shaft 22.

Mounted to swing on the end portions of the shaft 4 are the side arms of an external yoke 53, the latter being suitably weighted as indicated at 54. The rear bar of this weighted yoke normally bears upon the head of the lever 14. Pivoted to one of the outer ends of the yoke 53 is a spring actuated catch 55, the latter being shown in detail in Fig. 6 of the drawing. This spring actuated hook 55 is adapted when the drawer is opened and the yoke 53 swings downward to engage the top extension 41ª of the bar 41 and remain in engagement therewith until the drawer is partially closed.

56 represents a bell crank lever which is fulcrumed to the end frame of the machine in its upper portion, the upper frame of said bell crank having a shoulder in its upper side and outer end portion as indicated at 56ª and the lower end of the lower or rear arm of said bell crank being through the medium of a spring 57 retained in contact with the upper side of the yoke 53 when the drawer is closed and said yoke is in its elevated position. The parts being in this position, the reduced outer end portion of the upper arm of the lever 56, by which reduction the shoulder 56ª is cleared, is immediately below and out of contact with the pin 50. In the first operation of opening the drawer, which consists as hereinbefore described, in depressing the key 38, the rear arm of the lever 36 exerts a lifting action on the inwardly projecting pin 49 of the bar 48 and through the connection of the latter with the bar 41, said bar 41 is raised vertically out of the notch of the block 45. This being accomplished, the bar 41 and lower portion of the arm 40 is swung to a forward position through the tension of a spring 59 which exerts a rearward pressure on the upper portion of said lever 40. In this manner it will be seen that the depression of the drawer releasing key causes a sufficient rearward swinging movement of the upper portion of the lever 40 to impart a partial rotation to the shaft 22 and a consequent release of the pawls 21 from the indicator wheel ratchets 23. The release key having been depressed as hereinbefore described, it is obvious that the upper portion of the lever 40 will have moved sufficiently toward the rear to bring the pin 50 in position for engagement with the upper side of the lever 56 in rear of its offset 56ª and as the drawer moves to the open position and the yoke 53 descends, it is obvious that the spring 57 will serve to lift the upper arm of the bell crank 56 into engagement or contact with said pin 50. In the beginning of the drawer closing movement, it is evident that the upward movement of the weighted yoke 53 must through the engagement of its hook 55 with the extension 41ª of the bar 41, result in said bar 41 and lower portion of the lever 40 being forced rearward until the lower end of said bar 41 drops into engagement with the notch of the bar 45. It will also be seen that the movement thus imparted to the lever 40 has resulted in the pin 50 dropping into engagement with the shoulder 56ª of the bell crank 56, which engagement will continue until the weighted yoke has by contact with the lower arm of the lever 56 disengaged or thrown said parts out of contact. A further result of the first operation of closing the drawer is imparting to the shaft 22 a sufficient rotary movement to engage the pawls 21 with the teeth of the ratchet wheels 23. It will be seen, however, that owing to the engagement or contact of the pin 50 and lever arm shoulder 56ª, the indicator wheels cannot be released by depression of the drawer releasing key while the drawer is being closed.

It will be understood that there is a yielding connection between the frame yokes 6 and the racks which turn the indicator wheels, in order to permit the said yokes to swing upwardly with the closing movement of the drawer while the indicator wheels remain locked by the pawls 21. This form of connection is particularly described in my said pending application #700,908, although such a form as is shown in the patent to McCormick #570,141 dated Oct. 27th, 1896 may be employed. With such a connection, as soon as the indicator wheels are released by the rotation of shaft 22, they will return to zero, or as nearly to zero as the partially lifted frame will permit. It will be seen that if the bell crank 56 is not employed it is possible for a dishonest employee to partially close the cash drawer (the first inward movement of which locks the indicator wheels) and lift the yoke frames a corresponding distance. If, then, he depresses the release key, the indicator wheels will be unlocked, and will return as nearly to zero as the yoke frames will permit, which will result in the indication of a sale smaller than the actual sale, and, the drawer still being partly open, the difference between the actual and indicated sales could be extracted therefrom. With the bell crank, however, the indicators can not be unlocked until the drawer is practically closed.

In my said former applications, I provided the upper side of the base plate of the machine frame with a rack bar which in the present instance is indicated more clearly in Fig. 2 at 60. With the teeth of this rack was adapted to engage a swinging dog or pawl which was supported from a bracket projecting from the drawer, the engagement of said pawl with said rack teeth operating to prevent a closing of the drawer after the same had been partially opened and prevent the drawer being opened after the same was partially closed. In the present case, I have improved the pawl holding bracket which is indicated at 61 and the swinging pawl of which is indicated at 62, by providing rear and forward extensions of said bracket top as indicated at 63, said extensions having passing therethrough vertically adjustable screws 64 with which the pawl 62 in its upward swinging movement in either direction will contact. In this manner the pawl is prevented by sudden jar or jolt of the drawer from being swung upward to such height as to admit of an outward or inward movement of the drawer, while the pawl is out of contact with the rack teeth.

In Figs. 4 and 8 of the drawing, I have shown a desirable form of bill holding attachment for the cash drawer of my improved register, this spring bill holder consisting as indicated in said figures, of a stationary wire yoke or frame 15ª with the parallel arms of which are jointedly connected the arms of a U-shaped termination or rear end of a wire clamping frame 15ᵇ, the latter having its forward portion bent to form a flaring head 15ᶜ said hinged clamping section 15ᵇ being connected by a spring 15ᵈ with the rear portion of the stationary frame 15ª, said spring serving to press the clamping head 15ᶜ against the bottom of the drawer or the bills which may rest on said drawer bottom.

It will be observed that the bill holder spring 15ᵈ will not only serve to hold the bill holder in the depressed position indicated in Fig. 4 of the drawing, but that when the drawer is open and the holder thrown up above a horizontal position, said spring will serve to retain the forward portion of the holder elevated above the drawer holding portion of the machine. It will thus be observed that when the drawer is open and the holder has been lifted to its elevated position, the outer portion of the holder will when the drawer is closed, by a contact with the forward portion of the main case be automatically depressed on to the bills which may be contained in the drawer.

As hereinbefore set forth a part of my invention consists in providing a cash register of the general character hereinbefore described with a check printing mechanism, the construction and operation of which I will now proceed to describe. At one end of the machine on the outer side thereof, I support on the base plate a frame 65, this frame consisting mainly of inner and outer side portions 66 and 67 which rise from a floor or base portion 68, said frame being adapted in the manner hereinafter described, to contain and support the check printing mechanism. As in my said application No. 700,907, the side arms of the yokes 6 which are toward that side of the machine on which is located the check printer frame have connected therewith the inner side arms of smaller yoke shaped frames 69, the latter extending forwardly from the shaft 4 and having their outer side arms fulcrumed on the outward extension of said shaft 4. With this outer yoke side arms are formed printing segments 70 one for each of said yokes 69 and consequently for each yoke 6, the curved lower or outer faces of said printing segments having formed thereon type faces 71 which include the numerals from naught to nine. These printing segments as shown in the drawings, depend within the upper portion of the frame 65.

72 represents a platen frame, the rear portion of which is fulcrumed on a transverse rod 73 in the rear portion of the frame 65. The forwardly extending arm portion of the platen frame has its outer or forward end portion turned upwardly to form a printing head 72ª and said head portion is provided on one side with an outwardly extending pin 74. I also secure to a downwardly extending lug 75 of the forward arm of the platen frame the lower portion of a paper cutting blade 76 which as indicated more clearly in Figs. 19 and 14 of the drawing, extends upward through an opening in said platen frame, its beveled upper and cutting end portion being adapted when said platen frame is raised to shear against the face or forward end of a co-acting stationary cutter bar 77. This body or forward portion of the platen frame is supported on a vertical spring 72ᵇ which is interposed between the base of the frame 65 and the underside of said platen frame, the tendency of said spring being to elevate said platen frame until its upturned hammer portion 72ª contacts with oppositely located type faces of the printing segments 70. The rear portion of the platen frame arm has formed therewith and rising therefrom a frame standard 78, to the upper end of which is pivoted as indicated at 79 (see Fig. 19) a forwardly extending arm 80 of an ink pad carrying block 81, the latter being supported, as shown, at the forward end of said arm 80 and being provided on its upper side with a transverse inking pad 82 of suitable absorbent material. As indicated in the drawing, one of the outer sides of the pad block 81 is provided with a laterally extending catch strip 83, the beveled tooth termination of which is in the manner hereinafter described, adapted to engage a correspondingly shaped tooth on the outer end of the horizontal portion of an angular catch piece 84, the vertical portion of said catch piece being provided with a rearwardly extending spring strip or spring supporting arm 85 which is secured to the inner frame side and a short inwardly extending pin 86, the latter projecting through the frame side 66. The ink pad block 81 is provided with a rearwardly extending guide bar 87 which is adapted to move between guide lugs 88 on a transverse frame piece 77. Between two rear frame standards 65ᶜ which rise from the frame sides 67 and 66 is journaled a paper strip carrying roll 90.

91 represents a drum or cylindrical casing, the sides of which are provided with central oppositely located trunnions 92 and 93, the short trunnion 92 bearing in the outer side of the frame 65 and the inner and longer trunnion or shaft passing through the inner frame side and having its reduced outer end portion carrying loosely a pinion wheel 94. A portion of the trunnion 93 is inclosed by and has keyed to slide thereon a clutch sleeve 95, the outer end portion of which carries a toothed clutch head 96 which is adapted to engage a corresponding clutch head 97 carried on the pinion 94. These clutch heads are normally retained in engagement through the medium of a coiled spring 98 which is arranged between the end of the clutch sleeve and a gear wheel 99 which is secured to or formed with the outer side of the drum 91. The inner end of the clutch sleeve is also provided with an annular flange 100.

As indicated more clearly in Figs. 21 and 14 of the drawing, the drum 91 is provided at each end with an outwardly projecting rim 101 which, as shown in the drawing, is raised from the periphery of the remaining portion of the drum, these raised rim portions extending half way around the drum, thereby forming semi-circumferential flanges which are adapted in the manner hereinafter described to feed paper from the paper holding roll to the printing point. As indicated at 102 a portion of the space between the rims or flanges 101 is filled with suitable type or printing faces which are flush with the outer surfaces of said rims.

103 represents a short transverse shaft which is eccentrically journaled within the drum 91 and between the end walls thereof. Upon this shaft are journaled separately printing wheels or disks 104, each of the latter being provided at regular intervals with type projections 105, the numerals naught to nine being thus represented on each of said printing wheels. Upon the shaft 103 is also mounted loosely a wider printing disk 106 from the periphery of which project type faces at regular intervals indicating abbreviations of the months of a year. On the inner side of this disk 106 are also carried on said shaft, printing disks 107 one of said disks carrying type representations of the numerals from one to three inclusive and the remaining disk carrying type projections representing numerals from naught to nine inclusive.

Each of the printing disks above described has affixed thereto a ratchet wheel 108, the disks 104 having in addition to their regularly formed teeth a peripheral recess or deep notch 109.

Embracing the group of printing and ratchet wheels above described is a yoke 110, the side arms of the latter having their inner ends fulcrumed on the shaft 103 and the journaled side arm connecting rod 110ª of said yoke carrying thereon pawl arms 111 one for each of the ratchet wheels of the printing disks 104. The rod or shaft 110ª has one of its end portions extending outward as indicated through a curved slotted opening 91ª formed in one face of the drum 91. The outwardly projecting end of the shaft or rod 110ª is adapted to engage with the outer hook end of a hook or catch arm 110ᵇ, the outer end of which is pivoted on a stud 110ᶜ which projects from one of the frame standards. The hook or catch arm 110ᵇ is limited in its dropping movement by contact with a frame pin 110ᵈ. The face of the drum 91 is also provided near its periphery with a projecting contact pin 91ᵇ which in the manner and at the time hereinafter described, is adapted to contact with a lateral projection or lug 110ᵉ on the catch arm 110ᵇ. In securing the pawls 111 to the yoke rod, said pawls are arranged, as shown in Fig. 13, on different planes, that is, the contacting outer ends or points of the pawls are successively arranged one above the other, the outer pawl being the lower one. The yoke 110 is normally retained in an inclined position through the medium of a spring 112 which connects said yoke with the inner side of the drum. I also secure to the inner side of the drum projecting spring pawls or strips 113 which bear against the ratchets 108 and serve to retain the latter against overthrow or voluntary movement.

114 represents a feed roller which is so journaled within the frame 65 as to cause its periphery to contact with the raised flange portions of the drum. This feed roller 114 carries upon the inner end portion of its supporting shaft a gear wheel 115, the teeth of which gear with those of the wheel 99. Between the forward portions of the inner and outer frame sides 66 and 67, I provide a transverse plate 116 the latter being provided on its underside with a transverse passage 117. Supported between the rear portion of the framework is a shallow paper guide plate or sheath 118, the forward termination of the latter being adjacent to the stationary cutting blade 77.

On the inner side of the frame 65 and on the outer face of the frame standard 65ᵇ, I pivot the upper end of a depending latch bar 119, said latch bar being provided in its upper end portion with a spring 120 which tends to force said bar rearwardly. The lower end of the bar 119 is provided with an angular recess or notch 121 which by engagement with the outwardly projecting pin 74 of the platen frame, serves to normally retain the latter in a depressed position.

Upon the roll or reel 90 is mounted a paper strip coil or spool, said strip being indicated at 122. This strip as indicated in the drawing, runs downwardly from the reel over a journaled guide roller 123 from which said strip extends between the roll 114 and 91, thence through the sheath 118 and out through the passage 117 which is formed in the transverse plate 116 as heretofore described.

As indicated at 124, I provide an ink roller of suitable construction which is journaled on an outwardly extending arm 125 of one of the frame standards of the frame 65.

126 represents an angular clutch operating rod, the longer horizontal arm of which is journaled to slide in suitable keepers 127 affixed to the inner side of the inner frame portion 66, while the upturned vertical arm of said rod is provided with a forwardly turned termination 128, the latter increasing in width toward its outer end, resulting in the formation of a flaring head having an inclined side, as shown more clearly in Fig. 18 of the drawing. As indicated more clearly in Fig. 15, the inclined or flaring head of the rod 126 is supported in such position as to be adapted when the horizontal portion of said rod is pushed inward to cause said enlarged head portion to move rearwardly between the clutch flange 100 and the adjoining frame piece 66, thus forcing the clutch head 96 out of engagement with the outer clutch head 97. The horizontal portion of the rod 126 is also provided near its forward end with an upwardly extending and rearwardly bent arm 129.

To that side of the outer yoke 53 which is adjacent to the check printer mechanism, I affix the head or upper portion of a depending and forwardly inclined arm 130, this head portion having its rear side curved and toothed to form a gear segment, while the lower or finger portion 131 of the arm is curved downwardly and thence forwardly in such direction from said head portion as to result in the formation of a rear side recess 132 at the junction of the finger and head portion of said arm. Immediately above the recess 132 I provide on the outer side of the arm 130 a contact lug 133, see Fig. 16 the latter having its lower side beveled or rounded. I also provide the finger portion 131 with an outwardly projecting stud or pin 134. The teeth of the gear segment 130 are adapted to mesh with those of the pinion 94.

In order to illustrate the operation of the check printing mechanism herein described, we will assume that the five cent value key which belongs to the units set of said keys is depressed and that the cash drawer is then opened in the usual manner. As said drawer is opened and the units yoke 6 swings downward in the manner heretofore described, it is obvious that through the connection of said units yoke and the corresponding printing segment 70, the latter will be moved until the type representation of the numeral five thereon, is in position to receive the upward blow of the platen frame head when the latter is released in the manner hereinafter described. The descent of the outer weighted yoke 53 and the consequent downward and forward movement of the arm 130 results through the engagement of the rack portion of said arm with the teeth of the pinion 94 in imparting a rotary movement to the latter, this movement, however, not being contributed to the drum 91 owing to the fact that the inclination of the ratchet teeth of the clutch heads 96 and 97 is such as to prevent such rotary motion being contributed to the inner clutch head on the downward movement of said gear segment. The continued downward movement of the arm 130 and its finger 131 results in the contact of the lug 133 with the outwardly projecting pin 86 of the catch piece 84, this contact resulting in said pin 86 and the catch piece 84 being forced inward and the inward movement resulting through the contact of the inclined or toothed terminations of the horizontal arm of said catch piece and the bar 83, in the latter being raised until its tooth drops over and into engagement with the tooth of said catch piece. This upward movement of the ink pad block 81 results in said inking pad being raised to contact with the type numeral five on the operated printing segment 70 and with the type representations of the numerals naught of the other unoperated printing segments which are in line with said numeral five. This being accomplished the continued downward and forward movement of the finger 131 results in a contact of the pin 134 on said finger with the latch bar 119 which serves to move said latch bar out of engagement with the laterally projecting platen frame pin 74, said platen frame being thus released and through the tension of its spring 72$^b$ swung upward. This upward swinging movement of the platen frame results in the head 72$^a$ thereof driving the paper strip or that portion of the latter which is immediately over said head against the inked type faces. At the same time, it is obvious that the knife blade 76 by shearing against the fixed plate 77 has severed said paper strip, the detached check thus formed having thus printed thereon an amount corresponding with the amount of the value key depressed. Owing to the connection of the printing pad support with the standard 78 of the platen frame, it is obvious that in the above described upward movement of said platen frame, the ink pad will have been drawn rearward and out of the path of said platen head. It will be seen that this rearward movement of the printing pad also results in a disengagement of the tooth of the pad arm 83 and catch piece 84. The drawer now being moved to the closed position, the upward and rearward movement of the arm 130 results through contact of the curved rear side of the finger 131 with the pin 74 of the platen frame, in depressing the latter and causing its reëngagement with the angular or recessed end of the latch 119 which by release of contact with the pin 134 has again assumed a vertical position. This upward movement of said arm 130 also releases the pin 86 and allows the latter to again move outward and the catch piece 84 to assume its normal position. The closing movement of the drawer and consequent upward movement of the arm 130, also results in a rotation of the pinion 94 which through the shaft 93 imparts a rotary motion to the drum 91 and gear wheel 99 which motion is contributed through the engagement of the gear wheel 115 with said wheel 99 to the feed roller 114, the co-acting or contacting surfaces of the drum 91 and roller 114 serving to feed the paper strip inward through the sheath 118 to a printing position. It will be observed that in this rotary movement or feeding action of the drum and feed roller, the type faces 102 which are flush with the surfaces of the raised flange portions 101 which contact with the paper strip, will operate to print upon said paper strip during its passage between said raised or flanged portions, said type faces having been previously inked with the journaled ink roller 124. This last described printing operation is particularly adapted for use in printing the business card or advertisement on the check of the user of the machine.

I shall now proceed to describe the operation of the mechanism by means of which the checks are consecutively numbered and properly dated. In order to illustrate this operation, we will assume that the drum 91 has revolved to the position indicated in Fig. 21, that is, until the outwardly projecting pin or shaft 110$^a$ is in engagement with the end of the hook arm 110$^b$. The rotary motion of the drum being continued, it is obvious that the engagement of said pin and hook arm results in carrying the drum and the printing wheels 102 and their ratchets in the direction of the movement of a clock hand, until the projecting end of said pin 110 is in the opposite end of the drum slot 91$^a$. This movement of the drum has also brought the projecting pin 91$^b$ into contact with the projection 110$^c$ on the inner side of the catch arm 110$^b$ causing the latter to be lifted out of engagement with the pin 110$^a$. The spring 112 now operates to draw the pin 110$^a$ back to its first described position. Assuming that the first of the pawls 111$^a$ is in contact with one of the teeth of the outer or first ratchet 108, it is obvious that the above described movement of the drum must have resulted in said first ratchet wheel and the printing wheel with which it is connected, being rotated in a direction the reverse of that in which the drum is moving although carried by said drum in the rotary direction of the latter. In this manner the first ratchet wheel 108 is moved until the first pawl 111 is in engagement with a new notch of said ratchet wheel, the printing wheel 104 thus being rotated a sufficient distance to bring a new type projection 105 in position to contact with and print on that portion of the paper strip which is being fed between the surface of the roller 114 and the raised side portions of the drum 91. The complete rotation of the drum 91 results in the pin 110$^a$ again engaging with the hook end of the arm 110$^b$, the latter being prevented from dropping below a horizontal position by the stop pin 110$^d$. The continued rotation of the drum in the manner above described, results in the first of the pawls 111 successively engaging with the teeth of the first or outer ratchet wheel 108 until said pawl has dropped downward into the V-shaped recess 109 of said ratchet wheel. This inward dropping movement of said outer pawl results in a sufficient turn or rotary movement of the pin or shaft 110$^a$ to drop the next or succeeding pawl 111 into engagement with the first tooth of the corresponding ratchet, said pawls being thus successively dropped into engagement with the ratchets of the printing wheels so that when the consecutive units from one to naught are printed on the paper strip by the first printing wheel, said second or tens wheel comes into operation. In the manner above described, the pawls 111 successively drop into engagement with their ratchets resulting in the printing wheels 102 being brought one after the other into position to consecutively number the portions of the paper strip which are afterwards cut into checks in the manner heretofore described. In order that a proper date may be printed opposite the consecutive slip numbers, the dating wheels 106 and 107, are each turned by hand until the proper type faces thereof are in the printing position. It is obvious that the complete return of the weighted yoke 53 to its raised or normal position, must also result in the return or resetting of the operated yoke 6 and the printing segment 70 which is controlled thereby.

In order to disconnect or to throw out of operation, the check printing mechanism herein described, the rod 126 is pressed inward until its flaring end portion 128 by moving forward between the side of the frame 65 and the collar or flange 100 has forced the two clutch heads out of engagement with each other. It will thus be seen that the pinion 94 will be free to rotate without imparting motion to the part heretofore described as rotated therefrom. This is of a decided advantage where the numbering device is operated as a result of the rotation of the feed rollers; for if the rollers are merely separated from each other in order to stop the feed, as is the usual construction, and are permitted to rotate, the numbering device will keep count of the operations of the machine and not of the checks printed. By disconnecting the feed rollers from the operating parts, as I have done, the numbering device will operate only when the rollers turn, and the checks will thus be numbered consecutively. The inward movement of said rod also results in the engagement of its hook shaped arm 129 with the upper side of the pin 74 of the platen frame thereby preventing the usual operation of the latter.

I hereby disclaim in a cash register having a printing device and arranged to issue or not issue a check as desired, the combination of consecutive numbering wheels, a series of keys, and means controlled by the keys for moving said wheels relatively to each other only when a check is printed or issued.

Having now fully described my invention, what I claim and desire to secure by Letters Patent is,

1. The combination of a toothed wheel, a pivoted lever, a pawl on said lever for turning said wheel, an angular locking lever also carried on the pivoted lever and normally engaging the pawl to lock the same into engagement with the wheel, and means movable into contact with said locking lever after the pawl has come to rest to release the pawl from the wheel.

2. In a cash register, a registering wheel, a pivoted wheel, a pawl carried by said lever for turning the register wheel, an angular locking lever also carried by said pivoted lever for engaging the pawl and locking it to the register wheel, a key, and means released by the depression of said key for tripping the angular lever to free the pawl from its register wheel, substantially as described.

3. In a cash register, a registering wheel, a pivoted lever, a pawl carried by said lever for turning the register wheel, an angular locking lever also carried by said pivoted lever and having an extended arm, means for normally holding the locking lever in engagement with the pawl to lock the same to the register wheel, and means engaging the extended arm of said angular lever to free the same from the wheel after the pawl has come to rest, substantially as described.

4. In a cash register, the combination of an indicator, a register wheel, a pawl for turning said wheel, means for locking said pawl to the register wheel, a device for locking the indicator, and a common means for operating said locking devices, substantially as described.

5. In a cash register, a drawer, a register wheel, a pawl for turning said wheel, and means controlled by the drawer at the beginning of its inward movement for locking the pawl to the register wheel, substantially as described.

6. In a cash register, a register wheel, a pivoted lever, a pawl carried by said lever for turning said wheel, a drawer, means by which the lever is swung when the drawer is opened and closed, means for locking the pawl to the wheel while the drawer is closing, and mechanism movable into engagement with the locking means for unlocking the pawl while the drawer is opening, substantially as described.

7. In a cash register, the combination with a toothed and numbered registering wheel, a swinging arm and means for normally retaining the latter in a raised position and a pawl carried on said arm and adapted to engage a tooth of the registering wheel, a frame rod 26 carrying a movable spring actuated projection 27$^a$ which normally extends upward, of a bell crank lever fulcrumed in said pawl carrying arm, the lower arm of said lever normally contracting with said pawl and means whereby the projection of the rod 26 is at the release of the pawl carrying arm caused to exert a pressure on the upper arm of said bell crank sufficient to release the lower arm of the latter from contact with said pawl, substantially as specified.

8. In a cash register, the combination with a toothed and numbered registering wheel, a swinging pawl carrying arm 10, means for normally retaining the latter in its upper position, a bell crank lever fulcrumed in said pawl carrying arm, one arm of said lever normally contacting with the pawl of said arm 10, a frame rod, and a sleeve carried on said rod and having a projecting portion adapted to contact with the upper arm of said bell crank, of a shaft having journaled thereon indicator wheels each of the latter provided with a ratchet wheel, a pawl carrying shaft, the pawls of which are adapted to engage said indicator wheel ratchets, an arm depending from said pawl carrying shaft and a bar jointedly connecting said arm and the sleeve of the rod 26 and means for imparting a rotary motion to the shaft 22, substantially as specified.

9. In a cash register, the combination with a toothed and numbered registering wheel, a swinging arm 10, a pawl carried on said arm and adapted to engage a tooth of said registering wheel, a bell crank lever fulcrumed in said pawl carrying arm, one arm of said lever normally contacting with said pawl, a frame rod 26, a movable projection on said rod adapted to contact with and press against one arm of said bell crank, of a sliding cash drawer, means whereby the swinging movement of said pawl carrying arm is produced by the opening and closing of said cash drawer, a cash drawer releasing device, and connections between said releasing device and the movable projection of said rod 26 whereby said projection is caused to exert a pressure on one arm of said bell crank when said drawer releasing device is operated, substantially as specified.

10. In a cash register, the combination with a set of journaled indicator wheels and means for controlling the degree of movement of the same, of a spring actuated fulcrumed lever 40, a sliding bar 41 carried on said lever and adapted to engage a frame notch when depressed, a journaled rod 22 carrying means for locking said indicator wheels, a jointed connection between said rod 22 and said lever 40, a sliding cash drawer, a depressible drawer releasing key and means whereby the depression of said key lifts said sliding bar 41 out of its frame notch, substantially as specified.

11. In a cash register, the combination with a set of value keys, a set of rotary indicator wheels the movement of which is regulated by the value key depressed, a sliding cash drawer, a pivoted latch bar adapted to hold said cash drawer in a closed position, a depressible drawer releasing key, and a fulcrumed latch raising lever with which said drawer key is adapted to contact, of a fulcrumed lever 40, a sliding bar carried thereon one end of which is adapted to engage a frame notch, a pivoted bar 48 having a slotted opening loosely engaging a projecting pin of said sliding bar, said slotted bar having a pin adapted to contact with said latch raising lever and a journaled shaft 22 jointedly connected with the lever 40 and means on said shaft 22 for locking said indicator wheels, substantially as specified.

12. In a cash register, the combination with a set of journaled indicator wheels and means for controlling the degree of movement of the same, of a spring actuated fulcrumed lever 40, a journaled rod 22 carrying means for locking said indicator wheels and controlled by the movement of said fulcrumed lever 40, a sliding cash drawer, a depressible drawer releasing key and means whereby the depression of said key permits the lower portion of said bar 40 to swing forward, a swinging frame 53 adapted to follow the outward and inward movement of said drawer, a spring catch 55 on said swinging frame adapted to engage said bar 40 when the drawer is open and to return said bar to its normal position by the closing of said drawer, substantially as specified.

13. In a cash register, the combination with a set of journaled indicator wheels and means for controlling the degree of movement of the same, a sliding cash drawer, a swinging frame 53 adapted to swing downward and upward with the outward and inward movement of the cash drawer, and a spring hook 35 carried on said pivoted frame, of a spring actuated fulcrumed lever 40, a sliding bar 41 carried on said lever and adapted to engage a frame notch when depressed and having its upper portion adapted to engage said spring catch, a journaled rod 22 carrying means for locking said indicator wheels, a jointed connection between said rod 22 and said lever 40, a depressible drawer releasing key and means whereby the depression of said key lifts said sliding bar 41 out of its frame notch, substantially as specified.

14. In a cash register, the combination with a set of journaled indicator wheels and means for controlling the degree of movement of the same, a spring actuated fulcrumed lever 40, a sliding cash drawer, a depressible drawer releasing key, a journaled rod carrying means for locking said indicator wheels and connections between said bar 40 and journaled rod whereby the movement of the former controls the movement of the latter and means whereby the depression of said drawer releasing key normally actuates said bar 40, of a spring actuated fulcrumed lever 56 adapted to engage a projection on said bar 40 and prevent the rearward movement of the upper portion of the latter during the drawer closing operation, substantially as specified.

15. In a cash register, the combination with a set of journaled indicator wheels, means for controlling the degree of movement of the same, a journaled rod 22 carrying means for locking said indicator wheels, a fulcrumed lever 40, the movement of which governs the movement of said rod 22, a sliding cash drawer and a drawer releasing key the depression of which permits the operation of said bar 40, and a swinging frame 53 adapted to move downward and upward with the opening and closing of the drawer, of a fulcrumed bell crank 56 having one of its arms adapted to engage a projection of the bar 40 during the operation of closing the drawer and having its remaining arm adapted to contact with said swinging frame at the completion of the drawer closing operation, said contact operating to release the engagement of said lever and bar projection, substantially as specified.

16. In a cash register, an indicator, means for setting said indicator, a drawer, means controlled by the movement of the drawer for locking the indicator in its set position, means independent of the movement of the drawer for releasing the indicator, and means for preventing said release while the drawer is open, substantially as described.

17. In a cash register, an indicator, means for setting said indicator, a spring actuated shaft, a pawl on said shaft for locking said indicator in its set position, means for holding said shaft with the pawl in its locking position, and a key for releasing said shaft to permit the pawl to unlock the indicator, substantially as described.

18. In a cash register, a set of value keys, an indicator actuated from said swinging frame, a yielding connection between said indicator and frame, means for locking said indicator in its indicating position, means independent of the swinging frame for releasing the indicator before the frame starts on its actuating movement, a second frame means connected with the said second frame for locking the indicator at the beginning of the return movement of the same, and a device to prevent the actuation of the said releasing means until the second frame has returned to its starting position, substantially as described.

19. In a cash register, a feed roller for a paper check strip, means for operating the same, a device connected with said roller for numbering the checks, and means for disconnecting the roller from its operating means in order to stop the feed and the numbering device, substantially as described.

20. In a cash register, a feed roller for a paper check strip, means for operating the same, a numbering device mounted in said roller, means for operating the numbering device at each rotation of the roller, and means for unclutching the roller from its operating device in order to stop the feed and the numbering device, substantially as described.

21. In a cash register, a printing device, means for throwing the same into and out of gear with the operating parts of the register, and a numbering device which is so associated with the printer that it is operated only when the printing device is in gear, substantially as described.

22. In a registering machine, a printing device, a numbering device, means for normally operating said devices when the register is operated, and means for preventing at will the operation of the said devices when the register is operated.

23. In a cash register, a feed roller for a paper check strip, a numbering device mounted eccentrically within said roller, a frame carrying pawls for operating the numbering device, said frame being provided with a portion projecting beyond the end of the roller, a pivoted latch secured to the machine frame for catching and holding said projecting portion as the roller rotates, and means on the roller for tripping said latch, substantially as described.

24. In a cash register, a drawer, a swinging yoke controlled by said drawer, a segment on said yoke, feed rollers for a paper check strip, and a pinion on one of said rollers adapted to mesh with said segment as the yoke swings, substantially as described.

25. In a registering machine, a yoke, means for swinging said yoke, a segment connected with the yoke, a pinion driven by the segment, and a type carrier driven by said pinion.

26. In a cash register, the combination with a set of depressible value keys, a printing segment having type faces of corresponding values with the keys of said set and means between said keys and segment whereby the degree of movement of the segment is controlled by the key depressed, a cash drawer and a swinging frame 53 following the movement of said drawer, of a fulcrumed ink pad carrying frame, means for pressing the same in contact with a type face of said segment and withdrawing the same therefrom, a spring actuated normally latched platen frame adapted to be released through the downward movement of said frame 53, substantially as specified.

27. In a cash register, the combination with a set of depressible value keys, a printing segment having type faces of corresponding values with said keys, means between said keys and segment whereby the degree of movement of the segment is controlled by the key depressed, a sliding cash drawer and a swinging frame 53 following the movement of said drawer, of a spring actuated normally latched platen frame adapted by the movement of said swinging frame 53 to contact with a type face of said segment, means for inking said type face, a paper strip running between said platen and segment and paper feed rolls driven by the swinging movement of said frame 53, substantially as specified.

28. In a cash register, the combination with a set of value keys, a swinging frame 53, an arm 130 extending therefrom and having a gear segment, of a printing segment controlled by the key depressed, a swinging normally latched platen frame, a paper carrying roll and paper strip leading therefrom between said platen frame and segment, a rotary drum and paper feed roll gearing one with the other, a portion of the periphery of said drum being raised to coöperate with said feed roll in feeding the paper strip between the same, type faces between said raised peripheral portions, a pinion wheel on the shaft of said drum and adapted to engage the teeth of the gear segment on said arm 130 and a platen latch bar which by contact with said arm 130 causes said paper strip to be pressed into contact with a type face of the printing segment through the release of said platen frame, substantially as specified.

29. In a cash register, the combination with a coöperating registering and printing mechanism, a swinging arm 53 comprised in said registering mechanism, said swinging arm having an extension provided with a gear segment, a paper strip feed drum and feed roll geared therewith, a shaft projecting from said drum, a pinion and clutch section carried loosely on said shaft, said pinion adapted to gear with said arm gear segment and a sliding clutch section carried on said drum shaft and normally engaging the outer clutch section, of an angular rod 126 having a sliding support, one end of said rod adapted to be forced between a projection of said sliding clutch section and a stationary frame part, substantially as specified.

30. In a cash register, the combination with a frame or casing, and a sliding drawer therein, of a spring actuated bill holding clamp having a hinge connection with said drawer, the spring thereof adapted to retain said holder against the bottom of the drawer or in an elevated position whereby the closing of the drawer will through contact of said casing or frame with the holder cause the latter to be depressed, substantially as specified.

31. In a cash register, the combination with registering devices, of a series of operating pawls, means for locking said pawls in engagement with said registering devices, a movable frame arranged to govern said means, a spring for holding said frame in one position, and mechanism for moving said frame against the tension of the spring.

32. In a cash register of the class described, the combination with a registering mechanism, of operating levers for the same, operating pawls mounted on said levers, locking bell cranks also mounted on said levers and each formed with an extended arm, movable tripping devices for said bell cranks adapted to contact with the extended arms no matter what positions the operating levers may have assumed.

33. In a cash register, the combination with a register comprising a series of wheels, of a series of levers, pawls mounted on said levers, locking devices for said pawls also mounted on said levers, an independent rock frame arranged to lock said pawls to the wheels, means connecting said frame to the movable parts of the machine and means for connecting the locking devices to said movable parts of the machine.

34. In a cash register, the combination with registering wheels, of operating devices for the same, means for locking said devices in connection with the wheels, a rock frame for governing said means, a spring for holding the rock frame in one position and mechanism for moving said frame against the tension of its spring.

35. In a cash register, the combination with a register comprising a plurality of wheels having rack teeth formed on their peripheries, of operating pawls engaging said rack teeth, locking devices for said pawls, an operating mechanism and means connected to said operating mechanism and arranged to engage the locking devices for withdrawing them from the pawls upon the initial stroke of said operating mechanism.

36. In a cash register the combination with a register comprising a series of wheels, of operating levers, pawls mounted on said levers and engaging said wheels, locking devices mounted on said levers and engaging said pawls and formed with operating extensions, and movable means independent of the levers and continuously in position for actuating said extension.

37. In a cash register the combination with a register comprising a series of wheels, a series of levers, pawls mounted on said levers, locking devices for said pawls also mounted on said levers, an independent rock frame arranged to lock said pawls to the wheels and operate the locking devices, and means connecting said frame to the movable parts of the machine.

38. In a cash register the combination with a registering mechanism, a series of movable members, register operating pawls mounted on said members, an operating member connected to the movable parts of the machine, a series of movable pawl locking devices mounted on the movable members, and means for maintaining an operative connection between the operating member and the locking devices, no matter what positions the movable members may take up.

39. In a cash register the combination with a series of registering wheels, of a series of pivoted levers, operating pawls mounted on said levers, a series of locking pawls mounted on said levers and having upwardly projecting curved extensions, and a relatively stationary tripping device for said curved extensions arranged to operate the same, no matter what position the pivoted levers may have assumed.

40. In a cash register, the combination with a registering mechanism, of operating levers for the same, operating pawls mounted on said levers, a movable controlling frame, and a series of movable curved locking arms coöperating at all times with both the pawls and the controlling frame no matter what positions the operating levers may have assumed.

41. In a cash register, the combination with a register, comprising a plurality of wheels having ratchet teeth formed on their peripheries, of operating pawls engaging said ratchet teeth, locking devices for said pawls normally locking the same to the wheels, an operating mechanism for effecting retraction of the pawls over the ratchet teeth and subsequent advance of the pawls to turn the wheels, and means connected to said operating mechanism and arranged to engage the locking devices for withdrawing them from the pawls upon the initial movement of said operating mechanism with provisions for reëngaging the locking devices with the pawls for the advance movement of the same, substantially as described.

42. In a cash register, the combination of register ratchet wheels, oscillatory pawl-carriers with pawls to engage and operate said wheels, locking devices normally locking the pawls to the wheels, an operating mechanism for effecting the retraction of the pawl-carriers and the subsequent advance thereof to turn the wheels, and means for displacing the locking devices as a preliminary to the retraction of the pawl-carriers, and for effecting a restoration of the locking devices to locking relation with the pawls during the advance of the pawl-carriers.

43. In a cash register, the combination of register ratchet wheels, oscillatory pawl-carriers with pawls to engage and operate said wheels, locking devices normally locking the pawls to the wheels, an operating mechanism for effecting the retraction of the pawl-carriers and the subsequent advance thereof to turn the wheels, said mechanism comprising an oscillatory main actuator, and a series of auxiliary actuators, one for each of the pawl-carriers, means for displacing the locking devices as a preliminary to retraction of the pawl carriers and retaining said devices so displaced during such retraction of said carriers, with provisions for effecting the restoration of the locking devices to locking relation with the pawls during the entire advance movement of the pawl-carriers.

44. In a cash register, the combination of register ratchet wheels, oscillatory pawl carriers with pawls to engage and operate said wheels, locking devices normally locking the pawls to the wheels, an operating mechanism for effecting the retraction of the pawl carriers and the subsequent advance thereof to turn the wheels, a rocking frame for displacing the locking devices as a preliminary to retraction of the pawl carriers, means for rocking said frame to so displace said locking devices, means for retaining the frame in its displacing adjustment during the retraction of the pawl-carriers; and means controlled by the operating mechanism for actuating the retaining means and effecting a restoration of the said frame to its normal position and a reëngagement of the locking device with the pawls during the advance of the pawl-carriers.

45. In a cash register, the combination with ratchet registering wheels, pawl-carrying arms with pawls engaging the ratchets respectively, actuating yokes for the arms, and a main actuating lever for said yokes, all mounted concentrically and with the pawls normally advanced over the ratchets; of pawl locking levers normally engaged with the pawls under yielding pressure, a spring-actuated frame for disengaging said levers from the pawls normally retracted or withdrawn from disengaging position, a latch for holding the frame against the stress of its spring, means for effecting the displacement of said frame as an accompaniment to the release of the main lever whereby the pawls are unlocked at the commencement of an operation of the machine, and means for restoring the frame to its disengaging position as an accompaniment to the full swing of the main lever whereby the locking levers are caused to lock the pawls to the wheels in the advance of the main lever, the yokes and the pawl-carrying levers, and said pawls are left locked to the wheels at the conclusion of the operation of the machine.

46. In a cash register, the combination of register ratchet wheels, oscillatory pawl-carriers with pawls to engage and operate said wheels, locking devices normally locking the pawls to the wheels, an operating mechanism for effecting the retraction of the pawl-carriers and the subsequent advance thereof to turn the wheels, means including a latch for displacing and holding displaced the locking devices as a preliminary to retraction of the pawl-carriers, together with means controlled by said operating mechanism for unlatching the locking devices to permit a restoration of the same to locking relation with the pawls during the advance of the pawl carriers.

47. In a cash register, the combination of register ratchet wheels, oscillatory pawl-carriers with pawls to engage and operate said wheels, locking devices normally locking the pawls to the wheels, an operating mechanism for effecting the retraction of the pawl-carriers and the subsequent advance thereof to turn the wheels, a rocking frame for displacing the locking devices as a preliminary to retraction of the pawl-carriers, means for rocking said frame to displace said locking devices, a latch for retaining the frame in its displacing adjustment during the retraction of the pawl-carriers, and means controlled by the operating mechanism for tripping the latch to effect a restoration of the said frame to its normal position and a re-engagement of the locking devices with the pawls during the advance of the pawl-carriers.

HENRY S. HALLWOOD.

In the presence of—
J. H. FRAVEL,
H. B. BRADSHAW.